United States Patent [19]
Sorkin

[11] Patent Number: 6,108,910
[45] Date of Patent: Aug. 29, 2000

[54] DEVICE AND METHOD FOR STRIPPING A CABLE

[76] Inventor: Felix L. Sorkin, 4115 Greenbriar Dr., P.O. Box 1503, Stafford, Tex. 77477

[21] Appl. No.: 09/144,171
[22] Filed: Aug. 31, 1998
[51] Int. Cl.[7] .................................................... H02G 1/12
[52] U.S. Cl. ............................................ 30/91.2; 30/90.4
[58] Field of Search .................................. 30/90.1, 90.6, 30/91.2; 83/947; 29/564.4, 33 F; 81/9.4

[56] References Cited

U.S. PATENT DOCUMENTS

| | | | |
|---|---|---|---|
| 4,689,882 | 9/1987 | Lorenz | 30/90.1 |
| 5,042,337 | 8/1991 | Rodriguez | 83/13 |
| 5,632,088 | 5/1997 | Naso et al. | 30/91.2 |

FOREIGN PATENT DOCUMENTS

| | | | |
|---|---|---|---|
| 1247967 | 9/1971 | United Kingdom | 81/9.4 |

*Primary Examiner*—Douglas D. Watts
*Attorney, Agent, or Firm*—Harrison & Egbert

[57] ABSTRACT

A device for stripping a cable having a body with a channel extending therethrough and a knife affixed to a narrow end of the body and having a cutting edge extending at an acute angle relative to the longitudinal axis of the body. The body has a generally constant diameter portion. The body tapers so as to narrow in diameter toward the narrow end. The channel opens at both ends of the body. The knife is affixed at a bottom of the channel at the narrow end. The acute angle is between 70 and 89 degrees. An insert element is rigidly affixed to the narrow end of the body. The knife is attached to the insert element. This insert element is non-movably attached to the narrow end of the body.

12 Claims, 3 Drawing Sheets

DEVICE AND METHOD FOR STRIPPING A CABLE

TECHNICAL FIELD

The present invention relates to cable strippers for use with cable anchors for use in post-tension concrete structures. More particularly, the present invention relates to devices for stripping cable sheath from end portions of cables which are to be secured by the cable anchors. The present invention also relates to a method of stripping a sheath from an end portion of a cable.

BACKGROUND ART

The prior art is replete with concrete construction cable tensioning systems. These systems include both pre-stressed and post-tensioned cables and wire rope. Engineering in the post-tensioning of concrete is a well developed technology and the utilization of such tendons extending through a concrete slab or beam is conventional. The tendons provide structural strength for the concrete in a manner and at a cost not heretofore possible with conventional rebar construction. Utilization of such tendons does, however, require anchor assemblies on opposite ends thereof and the termination of the cable itself at the anchors. The anchor assembly secures the ends of the terminated tendons extending through the concrete bed whereby the tendons remain taut and effective during the life-span of the construction. The effectiveness requires the protection of the terminated tendons, which are usually made of steel or the like, from corrosion. Corrosion forces are well known to cause deterioration in the strength of the concrete if allowed to jeopardize the integrity of tensioning members. To prevent corrosion of the tendon, the steel fibers are usually sheathed in a plastic membrane throughout the length of the slab. The membranes do, however, require termination at the point where the tendons are secured within the anchor assemblies. The reason is obviously to provide appropriate structural integrity at the secured portion.

In the process of post-tensioning, it is important that the tendon is free to move within the hardened concrete so that the tensile load on the tendon is evenly distributed along the entire length of the structure. Methods used to ensure that the tendons provide free movement within the hardened concrete include laying a number of strands of wire in a sheath. It is within this sheath that the strands of wire are stressed after the concrete is hardened. After stressing, the wires exposed from the ends of the anchor assemblies are then cut-off or terminated.

During such post-tensioning of a concrete structure, it is known to insert an end of a cable, usually referred to as a "tendon", into a tapered passage extending through a cable anchor, and then to secure the cable to the cable anchor by means of wedges inserted into the tapered passage into engagement with the cable. However, before the insertion of the wedges, it is necessary to strip the sheath from the end portion of the cable. So as to preserve the "encapsulated" condition of such anchor assemblies and such cable, it is desirable to terminate the sheathing of the cable at appoint just rearward of the end of the wedges within the tapered bore of the anchor. As such, a more effective enclosing of the steel strands of wire within the cable is achieved.

U.S. Pat. No. 5,632,088, issued on May 27, 1997, to Naso et al., for a cable stripper device. The purpose of this cable stripper device is to allow for the stripping of the sheathing from the cable at a location just rearward of the end of the wedges within the tapered passage of the anchor. This cable stripper device has an elongate cutter on a tubular body. The cable stripper has a cutter at one end thereof with an inwardly projecting transverse cutter blade. The cutter and the tubular body are connected so as to allow the cutter to move relative to the tubular body. The tubular body is insertable into the tapered passage of the cable anchor. The tubular body has a frusto-conical surface so as to wedge the cutter blade into penetrating engagement with a sheath on the cable. The cutter blade is hingedly connected to the tubular body so as to be capable of moving inwardly and outwardly relative to the relative position of the end of the tubular body within the tapered passage of the anchor. The cutter blade is positioned at an end of this angular arm.

Unfortunately, with this device, in order to achieve the proper "cutting" effect, it is necessary to first insert the tool into the tapered passage of the anchor. When the tool has been inserted as far as possible into the tapered passage, it is necessary to hammer the opposite end of the tubular body so as to cause the cutter blade to "plow" through the plastic of the sheathing of the cable. When the exterior of the tapered portion of the tubular body is in surface-to-surface contact with the inner wall of the tapered passage of the anchor, the tool can then be rotated so that the cutter blade creates a cut through the sheathing which is transverse to the longitudinal axis of the cable.

Unfortunately, because of the strong forces that are required, the cutter blade must be formed of a hardened steel material. The arm having the cutter blade attached thereto must be machined and strongly affixed to the tubular body. The effort required to hammer the tubular body and to "plow" through the plastic can be extreme at times. As a result, workers will tend to take a more expedient approach and simply rotate the tool at an improper location before the desired position within the tapered passage of the anchor. As a result, the sheathing may remain in those areas which are to be exposed to the wedges. The effect of "plowing" through the plastic material of the sheathing in a longitudinal direction along the cable quickly causes the sharpness of the cutter blade to deteriorate. Furthermore, the tubular body of the tool requires that the entire tool be threaded over the exterior of the cable. Since the cable, in intermediate anchorages, can extend for a relatively long distance, a great deal of labor is required to properly "thread" the cable through the interior of the tubular body.

It is an object of the present invention to provide a method and apparatus for stripping the sheathing from a cable which grips the cable in an easier and more effective manner.

It is another object of the present invention to provide a method and device which allows the tool to be attached easily at any location adjacent to an intermediate anchorage of a post-tension system.

It is another object of the present invention to provide such a device which does not require "threading" over the length of the cable.

It is a further object of the present invention to provide such a device which facilitates the insertion of the tool into the wedge cavity of the anchor.

It is still another object of the present invention to provide a cable stripper device which avoids the "plowing" through the material of the sheathing of the cable.

It is still another object of the present invention to provide a tool which minimizes the machining required for the formation of the cutter blade.

It is still a further object of the present invention to provide a cable stripper which is easy to use, relatively inexpensive, and easy to manufacture.

These and other objects and advantages of the present invention will become apparent from a reading of the attached specification and appended claims.

SUMMARY OF THE INVENTION

The present invention is a device for stripping a cable comprising a body having a channel extending therethrough and having a narrow end, and a knife affixed to the narrow end. The channel opens at the narrow end of the body. The knife has a cutting edge extending at an acute angle relative to the longitudinal axis of the body.

In the present invention, the body has a generally constant diameter portion. The body tapers so as to narrow in diameter toward the narrow end. The generally constant diameter portion of the body includes a knurled exterior surface. The channel opens at an end of the body opposite to the narrow end. The knife is affixed to the bottom of the channel at the narrow end. The knife is affixed within the channel inwardly of the narrow end. The acute angle is between 70 and 89 degrees. Alternatively stated, this acute angle is offset between 1 and 20 degrees to a transverse of the longitudinal axis. In the preferred embodiment of the present invention, the acute angle is approximately four degrees. The channel opens to an outer diameter of the body. This channel has a width slightly greater than a diameter of the cable. An insert element is rigidly affixed to the narrow end of the body. The knife is attached to this insert element.

The present invention is also a method of stripping a sheathing from a cable in an anchor of a post-tension anchor system including the steps of: (1) forming a tool having a channel extending therethrough with a knife affixed at one end of the channel; (2) inserting the tool into the tapered bore of the anchor until the knife engages the sheathing of the cable; (3) rotating the tool around the cable such that the knife draws the tool further into the tapered bore; and (4) pulling the tool from the tapered bore so as to remove a cut section of the sheathing from the tapered bore. In this method of the present invention, the knife extends at an angle which is angularly offset to the transverse of the longitudinal axis of the tool. The channel is formed so as to have a width greater than a diameter of the cable. The channel opens at both ends of the tool. The tool is rotated until an outer surface of the tool abuts and is restricted by the tapered bore and cannot move any further into the tapered bore.

DETAILED DESCRIPTION OF THE PRESENT INVENTION

Figure 1:
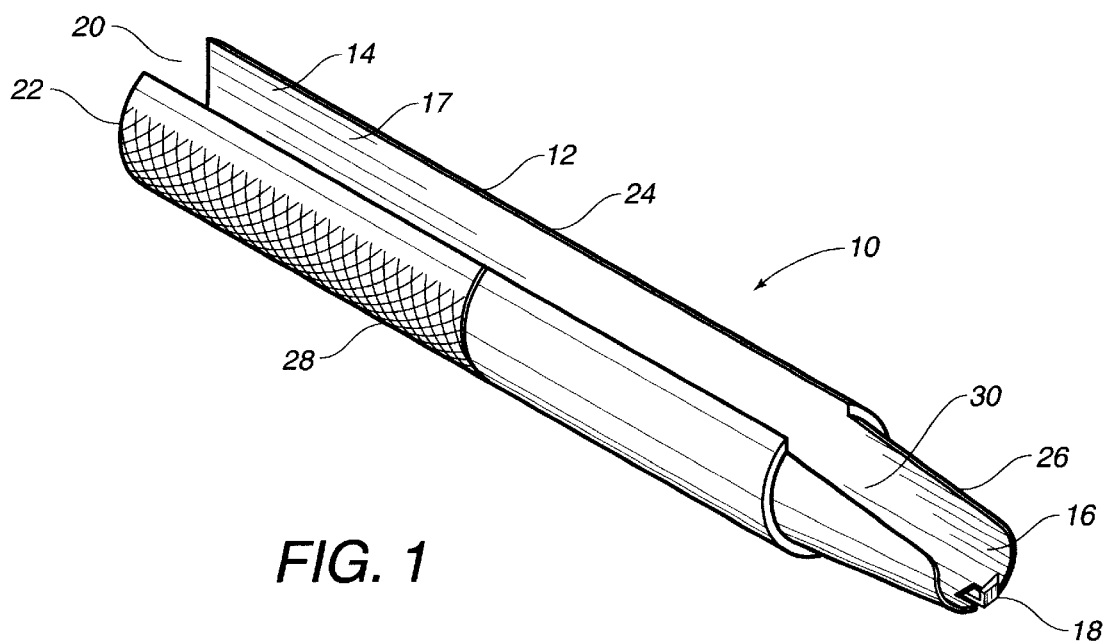
FIG. 1 is a perspective view of the device in accordance with the preferred embodiment of the present invention.

Referring to FIG. 1, there is shown at 10 the tool in accordance with the teachings of the present invention for the stripping of sheathing from a cable in a post-tension anchor system. The tool 10 has a body 12 having a channel 14 extending therethrough. The body has a narrow end 16 at one end thereof. A knife 18 is affixed at the narrow end 16 of the body 12. Knife 18 has a cutting edge extending at an acute angle relative to the longitudinal axis of the body 12.

In the present invention, the body 12 is formed of a very strong material, such as steel. The channel 14 extends through the interior of the body 12 so as to have one end opening at the narrow end 16 and an opposite end 20 opening at end 22 of body 12. The channel 14 should have a sufficient width and depth so as to accommodate the size of the cable which is to be stripped. In particular, the width of the channel 14 should be sufficient so that the cable, along with its sheathing, can be easily placed within the channel 14.

The body 12 has a constant diameter portion 24 and a tapered portion 26. The constant diameter portion 24 has a knurled surface 28 formed thereon. The knurled surface 28 facilitates the ability to properly rotate the tool 10 around the exterior of a cable within the channel 14. The tapered portion 26 of the body 12 narrows in diameter from the constant diameter portion 24 to the narrow end 16. The tapered portion 26 should have a size which is less than the size of the tapered passage within the anchor into which it is to be inserted. Generally, the angle of taper of the tapered section 26 will match the angle of tape of the tapered bore within the anchor. In actual use, the cable can simply be inserted into the channel 14 by placing the tool 10 over the cable. As such, the present invention avoids the problems associated with "threading" the cable through a tubular interior of the tool 10. The tool 10 is suitable for use in association with any sort of anchorages, including intermediate anchorages.

As can be seen in FIG. 1, the knife 18 extends across a portion of the bottom 30 of channel 14. The knife 18 is located at the narrow end 16 of the body 12. As will be described hereinafter, the cutting edge of the knife 18 is configured so as to facilitate the ability to insert the tool 10 into the tapered bore of the anchor and to facilitate the ability to properly cut the cable. The knife 18 may be formed of a stamped steel material. Within the concept of the present invention, it is not necessary to machine the cutting edge of knife 18 since it is not necessary for the cutting edge of knife 18 to "plow" through the plastic sheathing of a cable.

Figure 2:
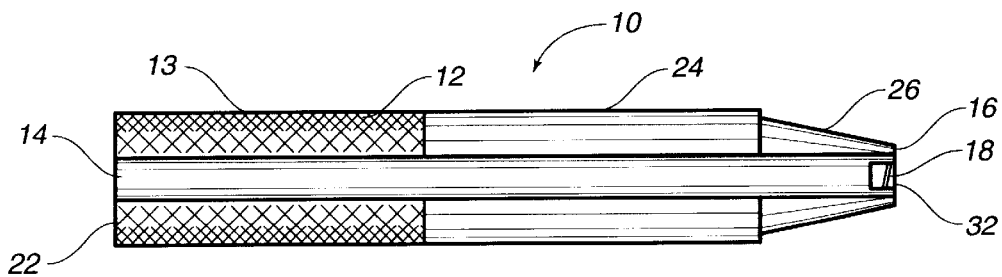
FIG. 2 is a plan view of the device in accordance with the preferred embodiment of the present invention.

FIG. 2 shows a plan view of the tool 10. As can be seen, the channel 14 extends longitudinally through the body 12. The channel 14 has one end opening at end 22 of body 12. The channel 14 has an opposite end opening at the narrow end 16 of body 12. The channel 14 has generally a constant width extending along its length. The body 12 has constant diameter portion 24 and tapered portion 26. The tapered portion 26 extends from the constant diameter portion 24 to the narrow end 16. An insert element 32 is positioned at the narrow end 16 of the body 12. Insert element 32 has knife 18 affixed thereto. Insert element 32 allows the knife 18 to be removed as necessary. When the insert element 32 is affixed at the narrow end 16 of the body 12, it is in a rigid and fixed non-movable condition. As used herein, the term "non-movable" refers to the fact that the insert element 32 and its associated knife 18 cannot move during the cutting of the sheathing of the cable.

As seen in FIG. 2, the knife 18 is positioned on the insert element 32. The knife 18 is illustrated as forming an acute angle with respect to the longitudinal axis of the body 12. Ideally, within the concept of the present invention, this acute angle should be between 70 and 89 degrees with respect to the longitudinal axis. Alternatively stated, this acute angle should be between one and twenty degrees with respect to a transverse of such a longitudinal axis. This arrangement is described, in greater detail, in association with FIG. 7.

Figure 3:
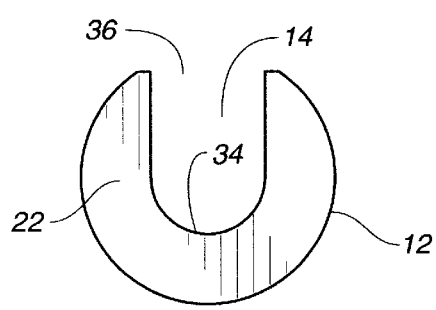
FIG. 3 is a rear view of the device in accordance with the preferred embodiment of the present invention.

FIG. 3 shows a view of end 22 of the body 12. As can be seen, the channel 14 has a width and height which is suitable for accommodating a cable extending therethrough. The bottom 34 of channel 14 is shown as curved. However, for the purposes of machining, the bottom 34 can also be flat. The choice of curved or flat bottomed surfaces is merely a matter of design choice. It can be seen that the channel 14 opens at 36 to the outer diameter of the body 12. As such, the body 12 can be easily placed over the exterior of a cable by simply placing the cable through the channel 14.

Figure 4:
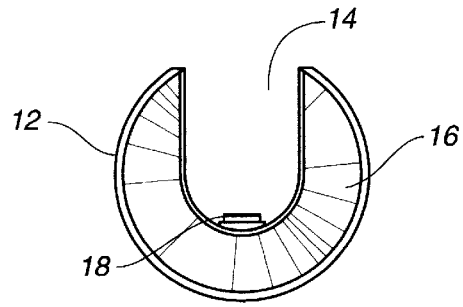
FIG. 4 is a frontal view of the device in accordance with the preferred embodiment of the present invention.

FIG. 4 shows the opposite end of the tool 10. In particular, it can be seen that the channel 14 extends to the narrow end 16 of body 12. The knife 18 is affixed at the bottom of channel 14 at the end 16.

Figure 5:
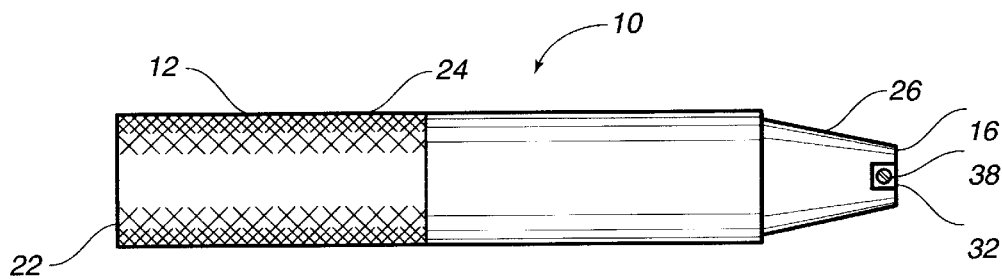
FIG. 5 is a bottom view of the device in accordance with the teachings of the present invention.

FIG. 5 is a bottom view of the tool 10. In FIG. 5, it can be seen that the body 12 has a body portion 24 of generally constant diameter and a tapered portion 26. The knurled surface 28 appears on the constant body portion 24 generally adjacent to the end 22 of body 12. As can be seen in FIG. 5, the insert element 32 is illustrated as affixed to the narrow end 16 of body 12 by the use of a set screw 38. As such, through the use of such a set screw, the insert element 32 can be removed as necessary for repair, replacement, or reuse.

Figure 6:
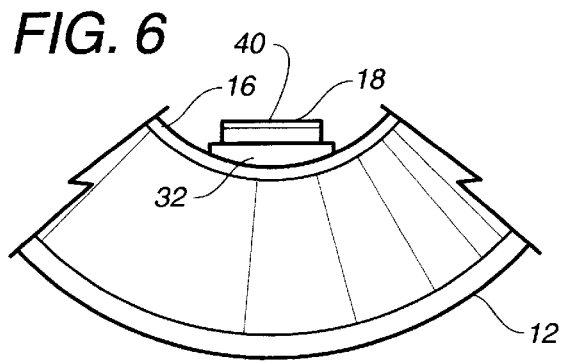
FIG. 6 is a greatly enlarged view showing the knife as affixed at the end of the tool of the present invention.

FIG. 6 shows how the knife 18 is placed at the narrow end 16 of the tool 10. As can be seen, the knife 18 has a cutting edge 40 along its top surface. The knife 18 is positioned on insert element 32. Insert element 32 is attached to the narrow end 16 of the body 12. The cutting edge 40 is shown as extending across a bottom of the channel.

Figure 7:
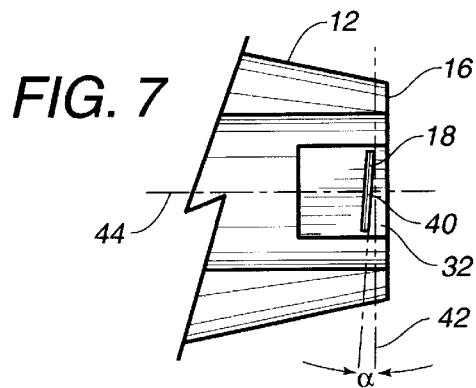
FIG. 7 is a greatly magnified plan view of the knife as attached to the end of the tool of the present invention.

FIG. 7 illustrates the manner in which the knife 18 is affixed on insert element 32 at the narrow end 16 of the body 12. In particular, the knife 18 has a cutting edge 40 which extends at an acute angle α relative to the transverse 42 of the longitudinal axis of the body 12. As used herein, the term "acute angle" can be used with reference to the longitudinal axis 44 or to the transverse 42 of the longitudinal axis 44. The angle α with respect to the transverse 42 is between 1 and 20 degrees. However, experimentation with the present invention has shown that the preferred embodiment of the present invention is with an angle α of four degrees. Translated with respect to the longitudinal axis 44, the angle would be 90°–α. As such, the cutting edge 40 should be placed at an angle of between 70 and 89 degrees with respect to the longitudinal axis 44 or, preferably, approximately 86 degrees to the longitudinal axis.

Figure 8:
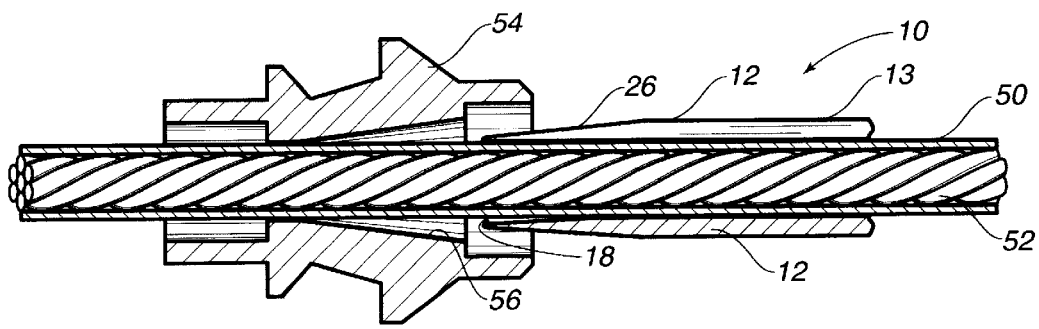
FIG. 8 illustrates the method of the present invention in which the tool is inserted into the tapered passage of an anchor.
Figure 9:
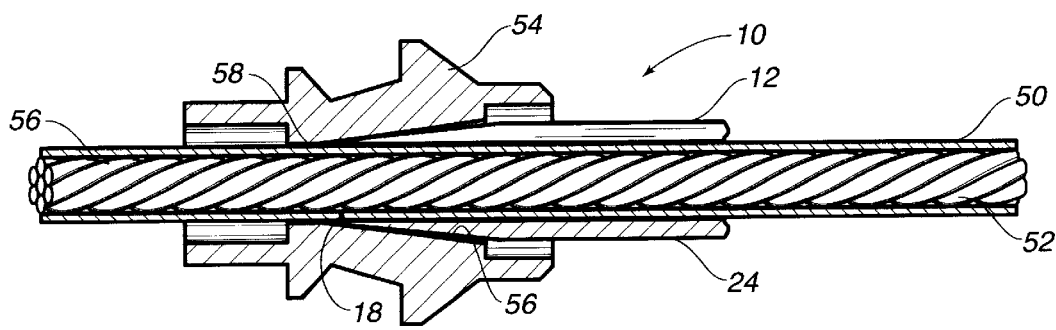
FIG. 9 is an illustration of the method of the present invention in which the tool is rotated so as to be in its terminal position within the interior of the anchor.
Figure 10:
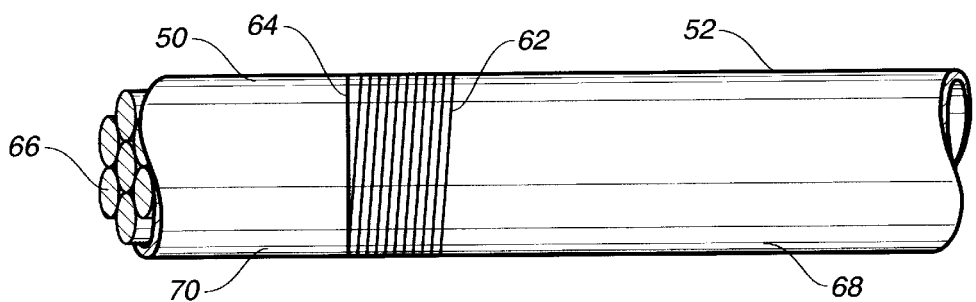
FIG. 10 is a diagrammatic illustration of how the tool of the present invention serves to draw the tool within the anchor body and to cut the sheathing from the cable.

FIGS. 8–10 show the manner in which the tool 10 can be used for the stripping of sheathing 50 from a cable 52. As illustrated in FIG. 8, the cable 52 has its sheathing 50 extending therearound. The cable 52 extends through the interior of an anchor 54. The anchor 54 has a tapered bore 56 suitable for the receipt of wedges therein. The anchor 54 which is illustrated is of a conventional configuration of such anchors.

As can be seen in FIG. 8, the tool 10 has body 12 extending around the exterior of the cable 52. The tool 10 is positioned generally outwardly of the tapered bore 56 relative to anchor 54. The knife 18 is positioned in close proximity to the sheathing 50 of the cable 52.

So as to initiate the proper cutting of the sheathing 50 from the cable 52, it is necessary to insert the tool 10 into the tapered bore 56 of anchor 54. This arrangement is illustrated in FIG. 9. Initially, the tool 10 is inserted so that the tapered portion 26 of body 12 resides within the tapered bore 56. The constant diameter portion 24 of the tool 10 should be gripped by hand and pushed into the tapered bore 56 as far as possible. At such a point, the cutting knife 18 will engage the sheathing 50 of cable 52.

The workman can then rotate the tool 10 in a suitable direction so that the cutting knife 18 will cut further into the sheathing 50. The tool 10 should continue to be rotated such that the angled relationship between the knife 18 and the longitudinal axis of the body 12 of tool 10 causes the tool 10 to be drawn further into the tapered bore 56. It is only with this angling of the knife that "drawing inward" effect is achieved. The tool 10 should continue to be rotated until the exterior of the tapered portion 26 of tool 10 strongly abuts the walls of the tapered bore 56 of anchor 54. At such a point the tool 10 will not be drawn in any further. As a result, the angled arrangement of the knife 18 will simply cut transversely through the sheathing 50. After sufficient cutting has occurred, the tool 10 can be pulled outwardly from the tapered bore 56 of anchor 54 so as to pull the sheathing 50 from the cable 52. As can be seen in FIG. 9, this sheathing is separated from the steel wires 56 in area 54. As the tool 10 is moved rearwardly, the sheathing 50 is separated from the cable 52.

In FIG. 10, it can be seen how the cutting knife 18 forms its incision into the sheathing 50 of cable 52. As can be seen, the rotation of the tool 10 creates a spiral pattern of incisions 62 through the sheathing 50. When the tool 10 reaches its terminal portion within the tapered bore 56, the continued rotation of the tool 10 creates a transverse cut 64. The sheathing 50 can be separated from the steel wires 66 at the area of the cut 64. Portion 68 can simply be pulled away from the section 70 so as to separate the sheathing 50.

Unlike the prior art, the present invention requires no hammering. Since there is no "plowing" effect caused by the knife edge, there is no need to create a sharp machined steel carbide cutting edge. The knife can be non-movably affixed to the end of the tool. There is no need for a pivoting arm as described in U.S. Pat. No. 5,632,088. The rotation of the tool 10 assures that the tool "bottoms out" within the tapered bore. As such, the problem of sheathing remaining in the area of the wedges is effectively avoided. The length of the tapered section will be identical to the length of exposed tendon desired for use in conjunction with the wedges. The channel which opens to the exterior of the body of the tool allows the tool to be easily placed over the cable rather than threaded along the cable.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A device for stripping a cable used in post-tension construction comprising:

a body having a channel extending therethrough, said body having a narrow end, said channel opening at said narrow end, said body having a longitudinal axis; and a knife affixed to said narrow end, said knife having a cutting edge extending at an acute angle relative to a transverse of said longitudinal axis of said body, said acute angle being approximately 4 degrees.

2. A method of stripping a sheathing from a cable in an anchor of a post-tension anchor system, the anchor having a tapered bore, the cable extending into the tapered bore, the method comprising:

forming a tool having a channel extending therethrough with a knife affixed at one end of said channel, said tool having a longitudinal axis, said knife being angularly offset to a transverse of said longitudinal axis;

inserting said tool into the tapered bore of the anchor until said knife engages the sheathing of the cable;

rotating the tool around the cable such that said knife draws said tool further into the tapered bore; and pulling the tool from the tapered bore so as to remove a cut section of the sheathing from the tapered bore.

3. The method of claim 2, said step of forming comprising:

forming a tapered section on said tool such that said tapered end narrows in diameter toward a narrow end, said tapered section having a diameter less than an inner diameter of said tapered bore.

4. The method of claim 3, said tapered section of said tool having an angle of taper generally matching an angle of taper of said tapered bore.

5. The method of claim 3, said step of forming comprising:

forming said knife such that said knife is angularly offset between 1 and 20 degrees to the transverse of the longitudinal axis.

6. The method of claim 5, said knife being angularly offset by approximately 4 degrees to the transverse.

7. The method of claim 3, said step of forming comprising:

forming said channel so as to have a width greater than a diameter of the cable, said channel opening at one end and at an opposite end of said tool.

8. The method of claim 2, said step of rotating comprising:

rotating said tool until an outer surface of said tool abuts the tapered bore and cannot move further into the tapered bore.

9. A device for stripping a cable comprising used in post-tension construction:

a body having a channel extending therethrough, said body having a first end, said body having a longitudinal axis;

an insert element fixed and non-movably attached at said first end; and a knife attached to said insert element so as to have a cutting edge extending upwardly therefrom and into said channel.

10. The device of claim 9, said cutting edge of said knife extending at an offset angle to a transverse to said longitudinal axis.

11. The device of claim 10, said offset angle being between 1 degree and 20 degrees.

12. The device of claim 11, said offset angle being approximately 4 degrees.

* * * * *